United States Patent

Tanaka et al.

[11] 3,846,432
[45] Nov. 5, 1974

[54] DERIVATIVES OF 1,2,3,4-TETRAHYDROISOQUINOLINE

[75] Inventors: Kunihiko Tanaka, Toyonaka; Teiji Kishimoto, Kawani; Hisanao Zenno, Kyoto, all of Japan

[73] Assignee: Fujisawa Pharmaceutical Co., Ltd., Osaka, Japan

[22] Filed: Dec. 20, 1971

[21] Appl. No.: 210,213

[30] Foreign Application Priority Data

Dec. 29, 1970 Japan.............................. 45-127198
Dec. 29, 1970 Japan.............................. 45-127199
Dec. 29, 1970 Japan.............................. 45-127200
Dec. 29, 1970 Japan.............................. 45-127202
Dec. 29, 1970 Japan.............................. 45-127201

[52] U.S. Cl.......... 260/283 S, 260/155, 260/283 S, 260/287 R, 260/288 R, 260/287 R, 424/258
[51] Int. Cl........................................ C07d 35/10
[58] Field of Search...................... 260/283 S, 289 R

[56] References Cited
UNITED STATES PATENTS

| | | | |
|---|---|---|---|
| 2,663,709 | 12/1953 | Craig................................ | 260/289 R |
| 2,683,146 | 6/1954 | Robinson......................... | 260/289 R |
| 3,042,671 | 7/1962 | Lombardino.................... | 260/283 S |
| 3,378,561 | 4/1968 | Montzka.......................... | 260/283 S |
| 3,389,141 | 6/1968 | Montzka.......................... | 260/289 R |
| 3,437,662 | 4/1969 | Gildersleeve et al. .......... | 260/289 R |
| 3,497,516 | 2/1970 | Mashimo et al. ................ | 260/289 R |
| 3,644,366 | 2/1972 | Jeanmart......................... | 260/283 S |
| 3,647,799 | 3/1972 | Watanabe........................ | 260/289 R |

OTHER PUBLICATIONS

Rumpf et al., in Chem. Abstr., Vol. 66, Col. 7200Y (1967).
Protiva et al., Chem. Abstr. Vol. 64, Col. 17556b (1966) Abstracting Czech. 113,765.

*Primary Examiner*—Donald G. Daus
*Attorney, Agent, or Firm*—Oblon, Fisher, Spivak, McClelland & Maier

[57] ABSTRACT

This invention relates to new derivatives of 1,2,3,4-tetrahydroisoquinoline having the general formula:

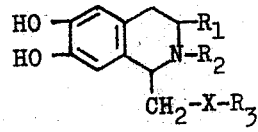

wherein $R_1$ and $R_2$ are each a hydrogen atom or a lower alkyl radical, X is an oxygen or sulfur atom, and $R_3$ is a phenyl radical having 1 to 3 substituent(s) selected from a group consisting of a lower, alkoxy, hydroxy, amino, nitro, halo(lower)alkyl radical and a halogen atom, production of the same and composition thereof. The compounds of this invention have relaxing activities on smooth muscles, especially on vascular-smooth and visceral smooth muscles.

39 Claims, No Drawings

DERIVATIVES OF 1,2,3,4-TETRAHYDROISOQUINOLINE

This invention relates to new derivatives of 1,2,3,4-tetrahydroisoquinoline having relaxing activities on smooth muscles. More particularly, this invention relates to new derivatives of 1,2,3,4-tetrahydroisoquinoline having the general formula:

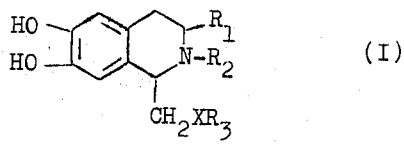

wherein $R_1$ and $R_2$ are each a hydrogen atom or a lower alkyl radical, X is an oxygen or sulfur atom, and $R_3$ is a phenyl radical having 1 to 3 substituent(s) selected from a group consisting of a lower alkoxy, hydroxy, amino, nitro, halo(lower)alkyl radical and a halogen atom; to pharmaceutically acceptable salts thereof; to methods for preparing the same; and to pharmaceutical compositions comprising these new derivatives or the salts thereof.

It is to be understood, within the scope of the present invention, that the term "lower" used in connection with an alkyl and alkoxy radicals is intended to mean an alkyl and alkoxy radicals having 1 to 6 carbon atoms unless otherwise indicated.

As a suitable lower alkyl radical in the above formula there may be mentioned, for example, a lower alkyl radical having 1 to 6 carbon atoms such as methyl, ethyl, propyl, isopropyl, butyl, isobutyl, t-butyl, pentyl or hexyl radical, and preferably a lower alkyl radical having 1 to 4 carbon atoms, and more preferably a lower alkyl radical having 1 to 2 carbon atoms.

As a suitable lower alkoxy radical in the above formula there may be mentioned, for example, a lower alkoxy radical having 1 to 6 carbon atoms such as methoxy, ethoxy, propoxy, butoxy, isopropoxy, isobutoxy, t-butoxy, pentoxy, isopentoxy or hexyloxy radical, and preferably a lower alkoxy radical having 1 to 4 carbon atoms, and more preferably a lower alkoxy radical having 1 to 2 carbon atoms.

As a suitable halo(lower)alkyl radical in the above formula there may be mentioned, for example, a halo(lower)alkyl radical having 1 to 6 carbon atoms such as chloromethyl, fluoroethyl, chloropropyl, bromopropyl, iodobutyl, chloropentyl, bromochloroethyl, dichloromethyl, dichloroethyl, difluoromethyl, dichloropropyl, trichloromethyl, tribromomethyl, trifluoromethyl, trichloroethyl or tribromoethyl radical, and preferably a halo(lower)alkyl radical having 1 to 4 carbon atoms, and more preferably a halo(lower)alkyl radical having 1 to 2 carbon atoms.

It is to be understood that the halogen atom in the above formula includes chlorine, bromine, fluorine and iodine atom.

The new derivatives of 1,2,3,4-tetrahydroisoquinoline of the formula [I] and pharmaceutically acceptable salts thereof have relaxing activities on smooth muscles, especially on vascular-smooth and visceral smooth muscles. Accordingly, they show vasodilating, intestinal-contraction inhibiting and bladder-contraction inhibiting activities, while not showing bronchodilating activities, and are useful as vasodilating, intestinal-contraction inhibiting and bladder-contraction inhibiting agents.

According to the present invention, the new derivatives of 1,2,3,4-tetrahydroisoquinoline of the formula [I] can be prepared by various methods which are illustrated as follows:

The fundamental method is representable by the following reaction:

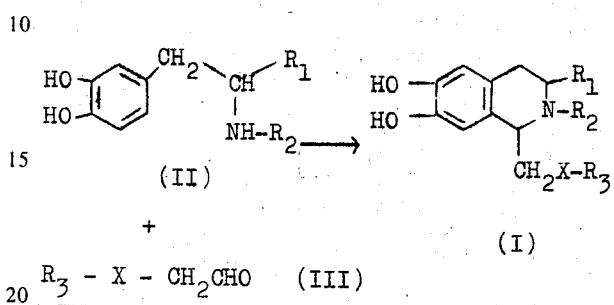

$$R_3 - X - CH_2CHO \quad (III)$$

wherein $R_1$ and $R_2$ are each a hydrogen atom or a lower alkyl radical, X is an oxygen or sulfur atom, and $R_3$ is a phenyl radical having 1 to 3 substituent(s) selected from a group consisting of a lower alkoxy, hydroxy, amino, nitro, halo(lower)alkyl radical and a halogen atom.

The reaction which is illustrated by the above reaction scheme is effected by reacting the compound (II) or the salt thereof with the aldehyde compound (III), or with the acetal, hemiacetal or hydrate thereof. Among the starting compounds (II), 4-(2-aminoethyl)-catechol can be prepared, for instance, by the method reported in the Chemical Abstracts, Volume 45 (1951), Column 1971d, and the other starting compounds can also be prepared by methods similar to the said journal or other methods known in the art. The present reaction is preferably carried out in the presence of an acid such as hydrochloric acid, sulfuric acid, hydrobromic acid, acetic acid, propionic acid, picric acid or the like, with or without a solvent such as methanol, ethanol, benzene, chloroform, dioxane or other organic solvent inert to the reaction. There is no limitation to the reaction temperature. However, it is preferably carried out with heating.

One of the alternative methods is shown in the following scheme:

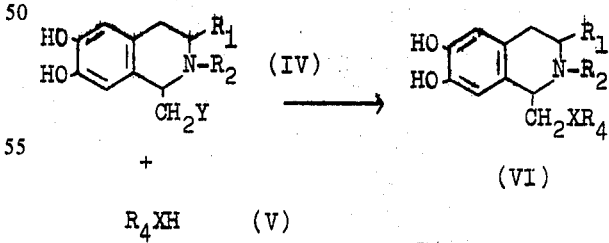

$$R_4XH \quad (V)$$

wherein $R_1$, $R_2$ and X are each as defined above, $R_4$ is a phenyl radical having 1 to 3 substituent(s) selected from a group consisting of a lower alkoxy, hydroxy, nitro, halo(lower)alkyl radical and a halogen atom, and Y is an acid residue.

The starting compounds (IV), which are novel ones, can be prepared by reacting 4-(2-aminoethyl)catechol or the corresponding derivative thereof with a derivative of acetaldehyde having the formula:

YCH₂CHO (VII)

wherein Y is as defined above.

As a suitable acid residue of the compound (IV) there may be mentioned, for example, an acid residue of an acid such as hydrochloric acid, sulfuric acid, hydrobromic acid, hydroiodic acid, alkyl sulfuric acid, toluenesulfonic acid, dialkylcarbamic acid and the like.

The reaction which is illustrated by the above reaction scheme is effected by reacting the compound (IV) or the salt thereof with the compound (V), and it is preferably carried out in the presence of a base such as an alkali metal (e.g. sodium, potassium, etc.), alkali earth metal (e.g. calcium, magnesium, etc.), alkali metal alkoxide (e.g. sodium methoxide, sodium ethoxide, potassium methoxide, potassium ethoxide, sodium propoxide, etc.), tertiary amine (e.g. pyridine, triethylamine, trimethylamine, dimethylaniline, etc.) and the like. The present reaction is carried out with or without a solvent and preferably in a solvent. As a suitable solvent there may be mentioned, for instance, methanol, ethanol, ether, benzene, acetone, dioxane, acetonitrile, chloroform, mono- or dichloroethane, tetrahydrofuran, ethyl acetate, pyridine and other organic inert solvents in the reaction. There is no limitation to the reaction temperature.

Another alternative method is shown in the following scheme.

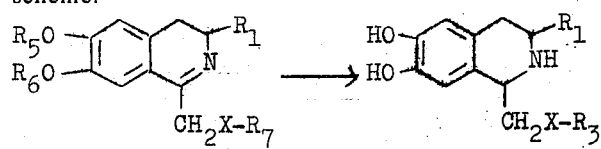

(VIII)                    (IX)

wherein $R_1$, $R_3$ and X are each as defined above, $R_5$ and $R_6$ are each a hydrogen atom, or individually or bound together protective groups of hydroxy radicals, and $R_7$ is a phenyl radical having 1 to 3 substituent(s) selected from a group consisting of a lower alkoxy, nitro, hydroxy which may be protected with a protective group, halo(lower)alkyl, amino radical and a halogen atom.

The starting compounds (VIII), which are novel ones, can be prepared by reacting a compound of the formula:

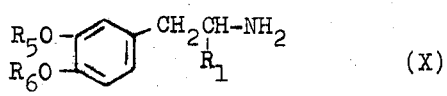

wherein $R_1$, $R_5$ and $R_6$ are each as defined above, with a compound of the formula:

$$R_7 - X - CH_2COOH \quad (XI)$$

wherein $R_7$ and X are each as defined above, or the reactive derivative thereof at the carboxy radical, and thereafter treating the resulting compound with a dehydrating agent.

In the above compounds (VIII), as a suitable individual protective group of a hydroxy radical there may be mentioned, for example, acetyl, benzyloxycarbonyl, 4-nitrobenzyloxycarbonyl, 4-bromobenzyloxycarbonyl, 4-methoxybenzyloxycarbonyl, 3,4-dimethoxybenzyloxycarbonyl, 4-(phenylazo)benzyloxycarbonyl, 4-(4-methoxyphenylazo)benzyloxycarbonyl, t-butoxycarbonyl, 1,1-dimethylpropoxycarbonyl, iso-propoxycarbonyl, diphenylmethoxycarbonyl, 2-pyridylmethoxycarbonyl, 2,2,2-trichloroethoxycarbonyl, 2,2,2-tribromomethoxycarbonyl, 3-iodopropoxycarbonyl 2-furfuryloxycarbonyl, 1-adamantyloxycarbonyl, 3-quinolyloxycarbonyl, trifluoroacetyl, benzyl, trityl, methoxymethyl, 2-nitrophenylthio, 2,4-dinitrophenylthio radical and the like.

As a suitable protective group of a hydroxy radical which $R_5$ and $R_6$ are bound together there may be mentioned, for example, an alkylene radical such as methylene, dimethylmethylene, ethylene radical and the like.

The present reaction which is illustrated by the above reaction scheme is effected by reducing the compound (VIII) or the salt thereof. The reducing reaction is conducted by a conventional manner known in the arts, for example, by a catalytic reduction, reduction with a reducing agent such as an alkaline metal aluminum hydride or alkaline metal borohydride, and reduction with an acid and metal. It is to be understood that the reducing method employed varies depending upon a kind of the starting compounds (VIII), and that, if the hydroxy radicals in the starting compounds (VIII) are protected with protective groups, it is necessary to conduct the reduction under a strong acidic condition. In a catalytic reduction, the reaction is carried out in a conventional manner using a conventional catalyst such as palladium carbon, Raneynickel, platinic oxide and the like, and it may be also carried out under increasing pressure. When an alkaline metal aluminum hydride is used, the reaction is carried out a conventional manner in a conventional solvent such as diethyl ether, dibutyl ether, tetrahydrofuran, dioxane and the like. As a suitable alkaline metal aluminum hydride there may be mentioned, for example, an alkali metal aluminum hydride (e.g., lithium aluminum hydride, sodium aluminum hydride, etc.) and alkali earth metal aluminum hydride (e.g., calcium aluminum hydride, magnesium aluminum hydride, etc.). When an acid and metal are used, the reaction is carried out a conventional manner using an acid such as hydrochloric acid, sulfuric acid, acetic acid, etc. and a metal such as iron, zinc, tin, etc. When an alkaline metal borohydride is used, the reaction is also carried out a conventional manner in a solvent as water, methanol, ethanol, tetrahydrofuran, dioxane, etc. As a suitable alkaline metal borohydride there may be mentioned, for example, an alkali metal borohydride (e.g., sodium borohydride, lithium borohydride, etc.) and alkali earth metal borohydride (e.g., magnesium borohydride, calcium borohydride, etc.).

If the symbol $R_7$ in the above formula (VIII) is a phenyl radical having nitro radical(s) as substituent(s), according to the present reaction with nitro radical(s) will be connected into amino radical(s) with the exception when an alkaline metal borohydride is used as a reducing agent, and it is to be understood that the reduction accompanied with such side reaction also falls within the scope of the present invention.

A further alternative method is shown in the following scheme.

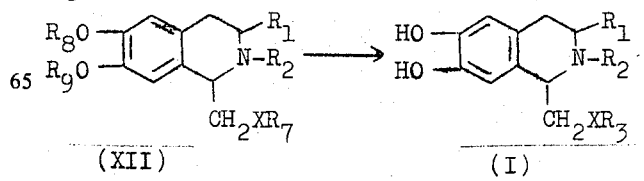

(XII)                    (I)

wherein $R_1$, $R_2$, $R_3$, $R_7$ and X are each as defined above, and $R_8$ and $R_9$ are individually or bound together protective groups of hydroxy radicals.

The starting compounds (XII), which are novel ones, can be prepared by reducing the afore-mentioned compound (VIII) wherein $R_5$ and $R_6$ are individually or bound together protective groups of hydroxyl radicals with an alkaline metal borohydride, and the other starting compounds can also be prepared according to a manner similar to the above method.

The present reaction which is illustrated by the above reaction scheme is effected by removing the protective groups of the compound (XII) or the salt thereof. The reaction for removing the protective groups is conducted by a conventional manner known in the arts, for example, by a hydrolysis or catalytic reduction of the compound (XII) or the salt thereof. However, it is to be understood that the reaction condition for removing the protective groups may vary depending upon the type of the protective groups to be used. If the protective groups are, for example, radicals such as benzyl, benzyloxycarbonyl, substituted-alkoxycarbonyl, adamantyloxycarbonyl, trityl, methoxymethyl, substituted-phenylthio radical and the like, the protective groups may be removed by hydrolysis, which is carried out by treating the compound (XII) or the salt thereof with water preferably in the presence of an acid such as hydrobromic acid, hydrochloric acid, formic acid, acetic acid, trifluoroacetic acid and the like. The hydrolysis can be also carried out in a solvent such as a hydrophilic organic solvent. If the protective groups are, for example, radicals such as benzyloxycarbonyl, substituted-benzyloxycarbonyl, 2-pyridylmethoxycarbonyl, diphenylmethoxycarbonyl, benzyl, trityl radical and the like, the protective groups may be removed by catalytic reduction, which is carried out according to a conventional manner known in the arts in the presence of a conventional catalyst such as palladium carbon and the like. If the protective groups are trifluoroacetyl radicals they can be easily removed only by treating the compound (XII) or the salt thereof with water. It is to be understood that the other conventional methods for removing protective groups of hydroxy radicals may also be employed.

It is to be further understood that the nitro radical(s) on the phenyl ring of the symbol $R_7$ are connected into the amino radical(s) when a catalytic reduction is employed for removing protective groups of hydroxy radicals, and that the present reaction for removing protective groups of hydroxy radicals accompanied with such side reaction also falls within the scope of this invention.

Typical compounds showing smooth muscle relaxing activities which fall within the category of the compounds of the formula [I] of this invention are illustrated in reference to some tests by which individual active ingredients are the following numbered compounds.

Compound No. 1
   1-(p-Hydroxyphenoxy)methyl-6,7-dihydroxy-1,2,3,4-tetrahydroisoquinoline hydrochloride Compound No. 2
   1-(m-Hydroxyphenoxy)methyl-6,7-dihydroxy-1,2,3,4-tetrahydroisoquinoline hydrochloride Compound No. 3
   1-(o-Hydroxyphenoxy)methyl-6,7-dihydroxy-1,2,3,4-tetrahydroisoquinoline hydrochloride Compound No. 4
   1-(3,4,5-Trimethoxyphenoxy)methyl-6,7-dihydroxy-1,2,3,4-tetrahydroisoquinoline hydrochloride Compound No. 5
   1-(p-Methoxyphenoxy)methyl-6,7-dihydroxy-1,2,3,4-tetraahydroisoquinoline hydrochloride Compound No. 6
   1-(p-Chlorophenoxy)methyl-6,7-dihydroxy-1,2,3,4-tetrahydroisoquinoline hydrochloride Compound No. 7
   1-(p-Fluorophenoxy)metheyl-6,7-dihydroxy-1,2,3,4-tetrahydroisoquinoline hydrochloride Compound No. 8
   1-(3,4-Dichlorophenoxy)methyl-6,7-dihydroxy-1,2,3,4-tetrahydroisoquinoline hydrochloride Compound No. 9
   1-(m-Trifluoromethylphenoxy)methyl-6,7-dihydroxy-1,2,3,4-tetrahydroisoquinoline hydrochloride Compound No. 10
   1-(2-Chloro-4-methoxyphenoxy)methyl-6,7-dihydroxy-1,2,3,4-tetrahydroisoquinoline hydrochloride Compound No. 11
   1-(p-Nitrophenoxy)methyl-6,7-dihydroxy-1,2,3,4-tetrahydroisoquinoline hydrochloride Compound No. 12
   1-(p-Aminophenoxy)methyl-6,7-dihydroxy-1,2,3,4-tetrahydroisoquinoline hydrochloride Compound No. 13
   1-(m-Chlorophenoxy)methyl-6,7-dihydroxy-1,2,3,4-tetrahydroisoquinoline hydrochloride Compound No. 14
   1-(p-Hydrophenyl)thiomethyl-6,7-dihydroxy-1,2,3,4-tetrahydroisoquinoline hydrochloride Compound No. 15
   1(p-Methoxyphenyl)thiomethyl-6,7-dihydroxy-1,2,3,4-tetrahydroisoquinoline hydrochloride Compound No. 16
   1-(p-Chlorophenyl)thiomethyl-6,7-dihydroxy-1,2,3,4-tetrahydroisoquinoline hydrochloride Compound No. 17
   1-(o-Chlorophenyl)thiomethyl-6,7-dihydroxy-1,2,3,4-tetrahydroisoquinoline hydrochloride Compound No. 18
   1-(p-Fluorophenyl)thiomethyl-6,7-dihydroxy-1,2,3,4-tetrahydroisoquinoline hydrochloride Compound No. 19
   1-(o-Fluorophenyl)thiomethyl-6,7-dihydroxy-1,2,3,4-tetrahydroisoquinoline hydrochloride Test 1.

Intestinal motility in dogs:
   Method: Mongrel dogs weighing 8 to 16 kg which were withheld from any food and water for 24 hours were anesthetized with a combination of urethane (1.5 g/kg) and morphine (15 mg/kg). A balloon was placed at the jejunum of the dog, compressed at a pressure of 10/cm., and connected to a strain gauge. Changes in the motility were mainly recorded in terms of amplitude, but taking account of the number of movements. The maximum change of all the determinations, served as the calculation of the 50 percent inhibition dose ($ED_{50}$). The time required for 80 percent recovery was considered as the duration of action. Results are shown in the following table.

| Compound No. | $ED_{50}$ ($\gamma$) | Duration of action (min.) |
| --- | --- | --- |
| 1 | 8 | 18 |
| 2 | 4.5 | 5 |
| 3 | 68 | 15 |
| 4 | 30 | 6 |
| 5 | 60 | 20 |
| 6 | 14 | 80 |
| 7 | 8 | 18 |
| 8 | 10 | 25 |
| 9 | 26 | 20 |
| 10 | 15 | 8 |
| 11 | 85 | 15 |
| 12 | 25 | 10 |
| 13 | 7.5 | 18 |
| 14 | 29 | 12 |
| 15 | 28 | 10 |
| 16 | 4 | 15 |
| 17 | 3.2 | 15 |
| 18 | 1.5 | 18 |
| 19 | 8 | 10 |

Test 2.

Blood flow of the internal carotid and femoral arteries:

Method: Mongrel dogs weighing 8 to 15 kg were anesthetized with pentobarbital sodium (35 mg/kg). The left internal carotid artery and the right femoral artery were mounted with probes of an electromagnetic flow meter, and the left femoral artery was connected to a strain gauge in order to measure the systemic blood pressure. The heart rate was measured with a tachometer connected to an electrocardiograph. The blood flow, blood pressure and heart rate were simultaneously recorded with a polygraph. The test compound was administered intravenously when a constant value was observed in each parameter to be tested. Changes (percent) after administration of the test compound were calculated. Results are shown in the following table.

| Test item | Conc. ($\mu$g) | Compound No. 6 | 1 | 4 | 18 |
| --- | --- | --- | --- | --- | --- |
| Internal carotid artery blood flow | 4 | — | — | — | +17 |
| | 16 | — | — | — | +16 |
| | 64 | — | +46 | +16 | — |
| | 1000 | +39 | +93 | +44 | — |
| Femoral artery blood flow | 4 | — | — | — | +65 |
| | 16 | — | — | — | +62 |
| | 64 | — | +61 | +31 | — |
| | 1000 | +68 | +129 | +48 | — |
| Heart rate | 4 | — | — | — | +6 |
| | 16 | — | — | — | +21 |
| | 64 | — | +11 | −1 − | +2 |
| | 1000 | +14 | +18 | | +13 |
| Blood pressure | 4 | — | — | — | −2 − | −12 |
| | 16 | — | — | | +4 − | −12 |
| | 64 | — | −11 | −3 − | +1 |
| | 1000 | +5 | −12 | −6 − | +4 |

Test 3.

Acute toxicity:

Method: The test compound was intravenously or orally administered to groups of male ICR-JCL strain mice weighing 25 – 35 g, each group consisting of 10 animals. Death was numbered for 7 days after the administration, and the $LD_{50}$ was calculated according to the Probit method.

| Compound No. | $LD_{50}$ i.v. (mg/kg) | p.o. (g/kg) |
| --- | --- | --- |
| 1 | 84 | > 2.8 |
| 4 | 216 | > 2.8 |
| 6 | 175 | 0.99 |
| 16 | 139 | > 2.8 |
| 18 | 148 | 1.47 |
| Isoprenaline | 97 | > 1.4 |

This invention will now be further described by reference to certain specific examples which are provided herein for purposes of illustration only and are not intended as limiting unless otherwise specified.

Example 1.

A solution of 4-(2-aminoethyl)catechol hydrobromide (0.42 g) and 2-(p-methoxyphenoxy)-1,1-ethanediol (0.3 g) in dry benzene (20 cc) was refluxed for 4 hours. The solvent of the solution was distilled off under reduced pressure, and the residue was recrystallized from a mixed solvent of ethanol and ether to give colorless crystals (0.5 g) of 1-(p-methoxyphenoxy)methyl-6,7-dihydroxy-1,2,3,4-tetrahydroisoquinoline hydrobromide, m.p. 240° – 243°C.

Example 2.

A solution of 4-(2-aminoethyl)catechol hydrochloride (0.42 g) and 2-(p-chlorophenoxy)acetaldehyde (0.35 g) in dry ethanol (20 cc) was refluxed for 4 hours. The solution was treated with an active carbon, and then the solvent was distilled off. The residue was treated with ether to give crystals (0.65 g) of 1-(p-chlorophenoxy)methyl-6,7-dihydroxy-1,2,3,4-tetrahydroisoquinoline hydrochloride, m.p. 227°C.

Example 3.

The following compounds were obtained according to a manner similar to that of the preceding Example 1 or 2.

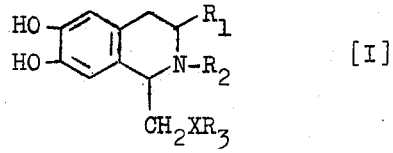

| No. | $R_1$ | $R_2$ | $R_3$ | X | Physical properties | (salt) |
|---|---|---|---|---|---|---|
| 1 | H | H | p-chlorophenyl | S | m.p. 200–203°C | (HCl) |
| 2 | H | H | 3,4,5-trimethoxyphenyl | O | Amorphous form | (HCl) |
| 3 | H | H | 2,6-dimethoxyphenyl | O | m.p. 199–201.5°C | (HCl) |
| 4 | H | H | m-chlorophenyl | O | m.p. 244–245°C | (HCl) |
| 5 | H | H | 2-chloro-4-methoxyphenyl | O | m.p. 215–219°C | (HCl) |
| 6 | H | H | 3,4-dichlorophenyl | O | m.p. 99°C | (HCl) |
| 7 | H | H | p-fluorophenyl | O | m.p. 93–95°C | (HCl) |
| 8 | H | H | m-trifluoromethylphenyl | O | m.p. 233–235°C | (HCl) |
| 9 | H | H | o-chlorophenyl | S | m.p. 249–251°C | (HCl) |
| 10 | H | H | p-methoxyphenyl | S | m.p. 161–162°C | (HCl) |
| 11 | H | H | p-fluorophenyl | S | m.p. 104–107°C | (HCl) |
| 12 | H | H | o-fluorophenyl | S | m.p. 193–195°C | (HCl) |
| 13 | H | H | p-hydroxyphenyl | S | Amorphous form | (HCl) |
| 14 | H | H | o-hydroxypehnyl | O | m.p. 239–241°C | (HCl) |
| 15 | H | H | m-hydroxyphenyl | O | m.p. 252–254°C | (HCl) |
| 16 | H | H | p-hydroxyphenyl | O | m.p. 262°C | (HCl) |
| 17 | $CH_3$ | H | p-hydroxyphenyl | O | m.p. 156°C | (HCl) |
| 18 | H | H | p-nitrophenyl | O | m.p. 238–240°C | (HCl) |
| 19 | H | H | p-aminophenyl | O | m.p. 287–288°C | (HCl) |
| 20 | H | $CH_3$ | p-hydroxyphenyl | O | m.p. 231–232°C | (HCl) |
| 21 | H | $CH_3$ | 2-chloro-4-methoxyphenyl | O | Amorphous form | (HCl) |

Example 4.

Sodium (0.13 g) was dissolved in dry ethanol (30 cc), and to the ethanolic solution were added p-chlorothiophenol (0.45 g) and 1-chloromethyl-6,7-dihydroxy-1,2,3,4-tetrahydroisoquinoline hydrochloride (0.7 g) in turn under ice-cooling. The mixture was stirred for 1 hour at the same temperature and for 1 hour at room temperature respectively. The solvent of the solution was distilled off under reduced pressure. The residue was alkalized by ammonia, and the alkaline solution was extracted with ethyl acetate. The ethyl acetate layer was washed with water and dried. The solvent of the ethyl acetate layer was distilled off, and the residue was treated with an ethanolic solution of hydrochloric acid. Precipitates were collected by filtration and recrystallized from a mixed solvent of ethanol and ether to give crystals (100 mg) of 1-(p-chlorophenyl)thiomethyl-6,7-dihydroxy-1,2,3,4-tetrahydroisoquinoline hydrochloride, m.p. 200° – 203°C.

Example 5.

A mixture of 1-chloromethyl-6,7-dihydroxy-1,2,3,4-tetrahydroisoquinoline hydrochloride (0.5 g), p-fluorothiophenol (280 mg), 50 percent sodium hydride (200 mg) and dry dimethylformamide (7 cc) was stirred for 1 hour at room temperature, and then for 1 hour at 50°C. The reaction mixture was poured into water, and the aqueous solution was extracted with ethyl acetate. The extract was washed with water and dried, and then the solvent was distilled off. The oily residue was subjected to a column chromatography of silica gel in which ethyl acetate was used as a developer. The solvent of the eluate was distilled off, and the residue was treated with an ethanolic solution of hydrochloric acid. Precipitates were collected by filtration to give crystals (50 mg) of 1-(p-fluorophenyl)thiomethyl-6,7-dihydroxy-1,2,3,4-tetrahydroisoquinoline hydrochloride, m.p. 104° – 107°C.

Example 6.

The following compounds were obtained according to a manner similar to that of the preceding Example 4 or 5.

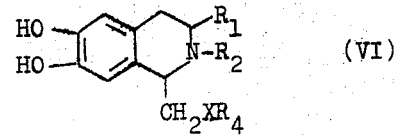

(VI)

| No. | $R_1$ | $R_2$ | $R_4$ | X | Physical properties | (salt) |
|---|---|---|---|---|---|---|
| 1 | H | H | o-chlorophenyl | S | m.p. 249–251°C | (HCl) |
| 2 | H | H | p-methoxyphenyl | S | m.p. 161–162°C | (HCl) |
| 3 | H | H | o-fluorophenyl | S | m.p. 193–195°C | (HCl) |
| 4 | H | H | p-hydroxyphenyl | S | Amorphous form | (HCl) |

Example 7.

A solution of 1-(p-hydroxyphenoxy)methyl-6,7-dihydroxy-3,4-dihydroisoquinoline hydrobromide (120 mg) and sodium borohydride (40 mg) in 99 percent ethanol (8 cc) was stirred for 1.5 hour at room temperature. The ethanol of the solution was distilled off, and to the residue was added water. The aqueous solution was neutralized by addition of hydrochloric acid, and precipitates were collected by filtration, washed with water and dried to give crystals. The crystals were coverted into the corresponding hydrochloride according to a conventional manner to give crystals (64 mg) of 1-(p-hydroxyphenoxy)methyl-6,7-dihydroxy-1,2,3,4-tetrahydroisoquinoline hydrochloride, m.p. 262°C.

Example 8.

1-(p-Benzyloxyphenoxy)methyl-6,7-dibenzyloxy-3,4-dihydroisoquinoline hydrochloride (5.0 g) was reduced by catalytic reduction in which the reaction was effected in an ethanolic solvent at 60°C using 10 percent palladium carbon (1.0 g) and hydrochloric acid (2 cc) under atmospheric pressure. The reaction mixture was filtered and the filtrate was concentrated under reduced pressure. The concentrate was treated with a mixed solvent of methanol and ether, and thus obtained crystals were recrystallized from the same mixed solvent to give 1-(p-hydroxyphenoxy)-methyl-6,7-dihydroxy-1,2,3,4-tetrahydroisoquinoline hydrochloride, m.p. 262°C.

Example 9.

The following compounds were obtained according to a manner similar to that of the preceding Example 7 or 8.

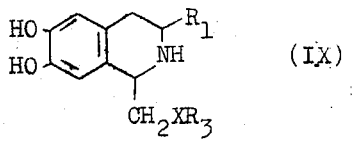

(IX)

10 percent palladium carbon (2.0 g) and conc. hydrochloric acid (3 cc) under atmospheric pressure. The reaction mixture was filtered, and the filtrate was concentrated under reduced pressure. The concentrate was recrystallized from a mixed solvent of ethanol and ether to give crystals (4.05 g) of 1-(p-hydroxyphenoxy)methyl-6,7-dihydroxy-1,2,3,4-tetrahydroisoquinoline hydrochloride, m.p. 262°C.

Example 11.

A solution of 1-(p-chlorophenoxy)methyl-6,7-dibenzyloxy-1,2,3,4-tetrahydroisoquinoline (1.5 g) in ethanol (22.5 cc) and conc. hydrochloric acid was refluxed for 18 hours. The solution was concentrated to dryness, and the concentrate was treated with a mixed solvent of isopropanol and ether. Precipitates were recrystallized from the same mixed solvent to give colorless crystals (0.9 g) of 1-(p-chlorophenoxy)methyl-6,7-dihydroxy-1,2,3,4-tetrahydroisoquinoline hydrochloride, m.p. 227°C.

Example 12.

The following compounds were obtained according to a manner similar to that of the preceding Example 10 or 11.

| No. | $R_1$ | $R_3$ | X | Physical properties | (salt) |
|---|---|---|---|---|---|
| 1 | H | p-chlorophenyl | S | m.p. 200–203°C | (HCl) |
| 2 | H | 3,4,5-trimethoxyphenyl | O | Amorphous form | (HCl) |
| 3 | H | 2,6-dimethoxyphenyl | O | m.p. 199–201.5°C | (HCl) |
| 4 | H | m-chlorophenyl | O | m.p. 244–245°C | (HCl) |
| 5 | H | 2-chloro-4-methoxyphenyl | O | m.p. 215–219°C | (HCl) |
| 6 | H | 3,4-dichlorophenyl | O | m.p. 99°C | (HCl) |
| 7 | H | p-fluorophenyl | O | m.p. 93–95°C | (HCl) |
| 8 | H | m-trifluoromethylphenyl | O | m.p. 233–235°C | (HCl) |
| 9 | H | o-chlorophenyl | S | m.p. 249–251°C | (HCl) |
| 10 | H | p-methoxyphenyl | S | m.p. 161–162°C | (HCl) |
| 11 | H | p-fluorophenyl | S | m.p. 104–107°C | (HCl) |
| 12 | H | o-fluorophenyl | S | m.p. 193–195°C | (HCl) |
| 13 | H | p-hydroxyphenyl | S | Amorphous form | (HCl) |
| 14 | H | o-hydroxyphenyl | O | m.p. 239–241°C | (HCl) |
| 15 | H | m-hydroxyphenyl | O | m.p. 252–254°C | (HCl) |
| 16 | H | p-methoxyphenyl | O | m.p. 240–243°C | (HBr) |
| 17 | $CH_3$ | p-hydroxyphenyl | O | m.p. 156°C | (HCl) |
| 18 | H | p-nitrophenyl | O | m.p. 238–240°C | (HCl) |
| 19 | H | p-aminophenyl | O | m.p. 287–288°C | (HCl) |
| 20 | H | p-chlorophenyl | O | m.p. 227°C | (HCl) |

Example 10.

1-(p-Benzyloxyphenoxy)methyl-6,7-dibenzyloxy-1,2,3,4-tetrahydroisoquinoline (8.5 g) was reduced by catalytic reduction in which the reaction was effected in 99 percent ethanolic solvent (150 cc) at 60°C using

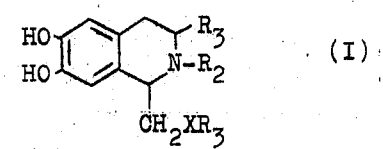

(I)

| No. | $R_1$ | $R_2$ | $R_3$ | X | Physical properties | (salt) |
|---|---|---|---|---|---|---|
| 1 | H | H | p-chlorophenyl | S | m.p. 200–203°C | (HCl) |
| 2 | H | H | 3,4,5-trimethoxyphenyl | O | Amorphous form | (HCl) |
| 3 | H | H | 2,6-dimethoxyphenyl | O | m.p. 199–201.5°C | (HCl) |

— Continued

| No. | R₁ | R₂ | R₃ | X | Physical properties | (salt) |
|---|---|---|---|---|---|---|
| 4 | H | H | m-chlorophenyl | O | m.p. 244–245°C | (HCl) |
| 5 | H | H | 2-chloro-4-methoxyphenyl | O | m.p. 215–219°C | (HCl) |
| 6 | H | H | 3,4-dichlorophenyl | O | m.p. 99°C | (HCl) |
| 7 | H | H | p-fluorophenyl | O | m.p. 93–95°C | (HCl) |
| 8 | H | H | m-trifluoromethylphenyl | O | m.p. 233–235°C | (HCl) |
| 9 | H | H | o-chlorophenyl | S | m.p. 249–251°C | (HCl) |
| 10 | H | H | p-methoxyphenyl | S | m.p. 161–162°C | (HCl) |
| 11 | H | H | p-fluorophenyl | S | m.p. 104–107°C | (HCl) |
| 12 | H | H | o-fluorophenyl | S | m.p. 193–195°C | (HCl) |
| 13 | H | H | p-hydroxyphenyl | S | Amorphous form | (HCl) |
| 14 | H | H | o-hydroxyphenyl | O | m.p. 239–241°C | (HCl) |
| 15 | H | H | m-hydroxyphenyl | O | m.p. 252–254°C | (HCl) |
| 16 | H | H | p-methoxyphenyl | O | m.p. 240–243°C | (HBr) |
| 17 | CH₃ | H | p-hydroxyphenyl | O | m.p. 156°C | (HCl) |
| 18 | H | H | p-nitrophenyl | O | m.p. 238–240°C | (HCl) |
| 19 | H | H | p-aminophenyl | O | m.p. 287–288°C | (HCl) |
| 20 | H | CH₃ | p-hydroxyphenyl | O | m.p. 231–232°C | (HCl) |
| 21 | H | CH₃ | 2-chloro-4-methoxyphenyl | O | Amorphous form | (HCl) |

Because of the possession of the said activities, the new derivatives of 1,2,3,4-tetrahydroisoquinoline of the formula [I] and pharmaceutically acceptable salts thereof are useful as a relaxant on smooth muscles and especially on vascular-smooth and visceral smooth muscles.

The new derivatives of 1,2,3,4-tetrahydroisoquinoline of the formula [I] and pharmaceutically acceptable salts thereof can be administered by the conventional methods, the conventional types of unit dosages or with the conventional pharmaceutical carriers to produce relaxing activities on smooth muscles of domestic animals.

Thus, they can be used in the form of pharmaceutical preparations, in admixture with a pharmaceutical organic or inorganic carrier material suitable for enteral or parenteral applications. Oral administration by the use of tablets, capsules or in liquid form such as suspension, solutions or emulsions is particularly advantageous. When formed into tablets, the conventional binding and disintegrating agents used in therapeutic unit dosages can be employed. Illustrative of binding agents there can be mentioned glucose, lactose, gum acacia, gelatin, mannitol, starch paste, magnesium trisilicate and talc. Illustrative of disintigrating agents there can be mentioned corn starch, keratin, colloidal silica and potato starch. When administered as liquids the conventional liquid carriers can be used.

The unit dosage or therapeutically effective quantity of the compounds [I] and pharmaceutically acceptable salts thereof for human beings can vary over wide limits such as that of 0.01 milligram to about 100 milligrams. The upper limit is limited only by the degree of effect desired and economical considerations. For oral administration it is preferable to employ from about 1 milligram to about 100 milligrams of the therapeutic agent per unit dosage. It is indicated from animal experiments that about 0.1 to about 10 milligrams dosages administered orally three times daily as needed will provide a preferred daily dosage. Of course, the dosage of the particular therapeutic agent used can vary considerably, such as the age of the patient and the degree of therapeutic effect desired. Each unit dosage form of the novel therapeutic compounds can contain from about 0.5 to about 99.5 percent of the novel therapeutic agents by weight of the entire composition with the remainder comprising conventional pharmaceutical carriers. By the term pharmaceutical carrier it is intended to include nontherapeutic materials which are conventionally used with unit dosage and include fillers, diluents, binders, lubricants, disintegrating agents and solvents. Of course, it is possible to administer the novel therapeutics, i.e. the pure compounds, without the use of a pharmaceutical carrier. It is also possible to administer the new derivatives of 1,2,3,4-tetrahydroisoquinoline of the formula [I] and pharmaceutically acceptable salts thereof in the form of a mixture with other agents which are used as a relaxant on smooth muscles and especially on vascular-smooth and visceral-smooth muscles.

| Formulae of the tablets are given below. | | |
|---|---|---|
| Ingredient | (mg) | (mg) |
| 1-(p-chlorophenoxy)methyl-6,7-dihydroxy-1,2,3,4-tetrahydroisoquinoline hydrochloride | 1.0 | 5.0 |
| Dextrin | — | 2.0 |
| Potato starch | — | 35.5 |
| Lactose | — | 34.4 |
| Spray-dry lactose | 44.2 | — |
| Avicel (Trademark) | 25.0 | — |
| Methyl cellulose | — | — |
| Magnesium stearate | 0.9 | 0.4 |
| Potassium carboxymethyl cellulose | 8.0 | 2.5 |
| Colloidal silicic acid | 0.9 | 0.2 |
| Total | 80.0 | 80.0 |
| Coated to make | 150.0 | 150.0 |

| Formula of an injectable solution is given below. | |
|---|---|
| Ingredient | (mg) |
| 1-(p-Chlorophenoxy)methyl-6,7-dihydroxy-1,2,3,4-tetrahydroisoquinoline hydrochloride | 1 |
| Sodium chloride | 9.0 |
| Distilled water for injection | to make 5 cc |
| pH | 5.0–7.5 |

We claim:
1. A 1,2,3,4-tetrahydroisoquinoline having the formula:

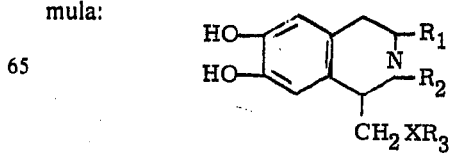

wherein $R_1$ and $R_2$ are each a hydrogen or lower alkyl having 1 to 2 carbon atoms, X is an oxygen or sulfur atom, and $R_3$ is phenyl having substituted thereon a substituent selected from the group consisting of lower alkoxy, hydroxy, amino, nitro, trifluoromethyl, trichloromethyl, tribomomethyl and halogen, or is phenyl having thereon two identical halogen substituents, a halogen and a lower alkyl substituent, or two lower alkoxy substituents, or is phenyl having thereon three lower alkoxy substituents, and pharmaceutically acceptable salts thereof, wherein "lower" refers to 1 to 6 carbon atoms.

2. A compound of claim 1, wherein $R_1$, $R_2$ and X are each as defined above, and $R_3$ is phenyl having a substituent selected from a group consisting of a lower alkoxy, hydroxy, amino, nitro, trifluoromethyl, trichloromethyl, tribromomethyl and halogen.

3. The compound of claim 1, wherein $R_1$, $R_2$ and X are each as defined above, and $R_3$ is phenyl having 2 substituents selected from a group consisting of lower alkoxy, hydroxy, amino, nitro, halo (lower) alkyl and halogen.

4. A compound of claim 2, wherein $R_1$, $R_2$ and X are each as defined above, and $R_3$ is phenyl having a halogen atom substituent.

5. A compound of claim 4, wherein $R_1$ and $R_2$ are both hydrogen atoms, X is as defined above, and $R_3$ is a phenyl having a chlorine substituent.

6. A compound of claim 5, wherein $R_1$ and $R_2$ are both hydrogen atoms, X is as defined above, and $R_3$ is p-chlorophenyl.

7. The compound of claim 4, wherein $R_1$ and $R_2$ are both hydrogen atoms, X is oxygen and $R_3$ is p-chlorophenyl.

8. The compound according to claim 5, wherein $R_1$ and $R_2$ are both hydrogen atoms, X is sulfur, and $R_3$ is p-chlorophenyl.

9. The compound of claim 5, wherein $R_1$ and $R_2$ are both hydrogen atoms, X is oxygen, and $R_3$ is m-chlorophenyl.

10. The compound of claim 5, wherein $R_1$ and $R_2$ are both hydrogen atoms, X is sulfur, and $R_3$ is o-chlorophenyl.

11. A compounds claim 4, whererin $R_1$ and $R_2$ are both hydrogen, X is oxygen or sulfur, and $R_3$ is phenyl having a fluorine substituent.

12. The compound of claim 11, wherein $R_1$ and $R_2$ are both hydrogen atoms, X is oxygen, and $R_3$ is p-fluorophenyl.

13. A compound of claim 11, wherein $R_1$ and $R_2$ are both hydrogen, X is a sulfur, and $R_3$.is o-fluorophenyl.

14. The compound of claim 11, wherein $R_1$ and $R_2$ are both hydrogen, X is sulfur, and $R_3$ is p-fluorophenyl.

15. A compound of claim 2, wherein $R_1$ and $R_2$ are each hydrogen or a lower alkyl of 1 to 2 carbon atoms X is oxygen or sulfur, and $R_3$ is phenyl having an hydroxy substituent.

16. The compound of claim 15, wherein $R_1$ and $R_2$ are both hydrogen, X is oxygen, and $R_3$ is o-hydroxyphenyl.

17. The compound of claim 15, wherein $R_1$ and $R_2$ are both hydrogen, X is an oxygen, and $R_3$ is m-hydroxyphenyl.

18. The compound of claim 15, wherein $R_1$ and $R_2$ are both hydrogen, X is oxygen, and $R_3$ is p-hydroxyphenyl.

19. The compound of claim 15, wherein $R_1$ and $R_2$ are both hydrogen, X is sulfur, and $R_3$ is p-hydroxyphenyl.

20. The compound of claim 15, wherein $R_1$ is methyl, $R_2$ is hydrogen, X is oxygen and $R_3$ is p-hydroxyphenyl.

21. The compound of claim 15, wherein $R_1$ is hydrogen, $R_2$ is methyl, X is oxygen and $R_3$ is p-hydroxyphenyl.

22. The compound of claim 2, wherein $R_1$ and $R_2$ are both hydrogen, X is oxygen or sulfur atom, and $R_3$ is phenyl having a lower alkoxy substituent.

23. The compound of claim 22, wherein $R_1$ and $R_2$ are both hydrogen, X is oxygen, and $R_3$ is p-methoxyphenyl.

24. The compound of claim 22, wherein $R_1$ and $R_2$ are both hydrogen, X is sulfur, and $R_3$ is p-methoxyphenyl.

25. The compound of claim 2, wherein $R_1$ and $R_2$ are both hydrogen, X is oxygen, and $R_3$ is phenyl having a halo (lower) alkyl, substituent.

26. The compound of claim 25, wherein $R_1$ and $R_2$ are hydrogen, X is oxygen, and $R_3$ is trifluoromethylphenyl.

27. The compound of claim 2, wherein $R_1$ and $R_2$ are both hydrogen, X is oxygen, and $R_3$ is p-nitrophenyl.

28. The compound of claim 2, wherein $R_1$ and $R_2$ are both hydrogen, X is oxygen, and $R_3$ is p-aminophenyl.

29. The compound of claim 3, wherein $R_1$ and $R_2$ are each hydrogen or lower alkyl of 1-2 carbon atoms, X is oxygen, and $R_3$ is phenyl having 2 substituents selected from a group consisting of a lower alkoxy and halogen.

30. The compound of claim 29, wherein $R_1$ and $R_2$ are both hydrogen, X is oxygen, and $R_3$ is phenyl having 2 lower alkoxy substituents.

31. The compound of claim 30, wherein $R_1$ and $R_2$ are both hydrogen X is oxygen, and $R_3$ is 2,6-dimethoxyphenyl.

32. The compound of claim 29, wherein $R_1$ and $R_2$ are each hydrogen or lower alkyl having 1 to 2 carbon atoms, X is oxygen, and $R_3$ is phenyl having lower alkoxy substituent and a halogen substituent.

33. The compound of claim 32, wherein $R_1$ and $R_2$ are hydrogen, X is oxygen, and $R_3$ is 2-chloro-4-methoxyphenyl.

34. The compound of claim 32, wherein $R_1$ is hydrogen, $R_2$ is methyl, X is oxygen, and $R_3$ is 2-chloro-4-methoxyphenyl.

35. The compound of claim 29, wherein $R_1$ and $R_2$ are both hydrogen, X is oxygen, and $R_3$ is phenyl having 2 halogen atom substituents.

36. The compound of claim 35, wherein $R_1$ and $R_2$ are both hydrogen, X is oxygen, and $R_3$ is 3,4-dichlorophenyl.

37. The compound of claim 1, wherein $R_1$ and $R_2$ are both hydrogen, X is oxygen, and $R_3$ is phenyl having 3 lower alkoxy substituents.

38. The compound of claim 37, wherein $R_1$ and $R_2$ are both hydrogen, X is oxygen, and $R_3$ is phenyl having three methoxy substituents.

39. The compound of claim 38, wherein $R_1$ and $R_2$ are both hydrogen, X is oxygen, and $R_3$ is 3,4,5-trimethoxyphenyl.

* * * * *

UNITED STATES PATENT AND TRADEMARK OFFICE
CERTIFICATE OF CORRECTION

PATENT NO. : 3,846,432
DATED : November 5, 1974
INVENTOR(S) : KUNIHIKO TANAKA ET AL Page 1 of 2

It is certified that error appears in the above-identified patent and that said Letters Patent are hereby corrected as shown below:

Column 4, line 31, after "out" insert --in--;
line 40, after "out" insert --in--;
line 44, after "out" insert --in--;
line 45, after "solvent" insert --such--;
line 54, delete "with" and insert --the--;
line 55, delete "connected" and insert --converted--.

Column 5, line 47, delete "connected" and insert --converted--.

Column 6, line 7, delete "tetraahydroisoquinoline" and insert --tetrahydroisoquinoline--;
line 12, delete "metheyl" and insert --methyl--;
line 36, delete "1-(p-Hydrophenyl)" and insert --1-(p-Hydroxyphenyl)--.

Column 9, in the table, under Column "$R_3$", No. 14, delete "o-hydroxypehnyl" and insert --o-hydroxyphenyl--.

Column 10, line 67, delete "cov-" and insert --conv- --.

Column 13, line 44, delete "disintigrating" and insert --disintegrating--.

Column 15, line 6, in Claim 1, delete "tribomomethyl" and insert --tribromomethyl--.

UNITED STATES PATENT AND TRADEMARK OFFICE
CERTIFICATE OF CORRECTION

PATENT NO. : 3,846,432
DATED : November 5, 1974
INVENTOR(S) : KUNIHIKO TANAKA ET AL It is certified that error appears in the above-identified patent and that said Letters Patent are hereby corrected as shown below:

Column 15, Claim 11, line 44, delete "compounds" and insert

--compound of--.

Column 15, Claim 15, line 57, after "atoms" insert a comma (,).

Signed and Sealed this twenty-second Day of June 1976

[SEAL]

Attest:

RUTH C. MASON
Attesting Officer

C. MARSHALL DANN
Commissioner of Patents and Trademarks